United States Patent [19]

Schonfeld

[11] Patent Number: 4,852,405
[45] Date of Patent: Aug. 1, 1989

[54] MACHINE FOR MASS-CENTERING ROTORS
[75] Inventor: Harald Schonfeld, Darmstadt, Fed. Rep. of Germany
[73] Assignee: Carl Schenck AG, Fed. Rep. of Germany
[21] Appl. No.: 141,995
[22] Filed: Jan. 6, 1988
[30] Foreign Application Priority Data Feb. 13, 1987 [EP] European Pat. Off. ........ 87102010.3

[51] Int. Cl.[4] .................. G01M 1/24; G01M 1/26
[52] U.S. Cl. ................................. 73/461; 73/477
[58] Field of Search .............. 73/461, 473, 475, 476, 73/477

[56] References Cited

U.S. PATENT DOCUMENTS

| 1,665,866 | 4/1928 | Trumpler . | |
|---|---|---|---|
| 2,329,835 | 9/1943 | Hope | 73/475 |
| 2,344,753 | 3/1944 | Van Degrift | 73/473 |
| 2,693,695 | 11/1954 | Jacobsen | 73/461 |
| 4,545,247 | 10/1985 | Wilson | 73/473 |
| 4,653,324 | 3/1987 | Nugier | 73/475 |

FOREIGN PATENT DOCUMENTS 875734  5/1953  Fed. Rep. of Germany .
975086  8/1961  Fed. Rep. of Germany .

OTHER PUBLICATIONS

"Die Automobilindustrie und Schenck, Auswuchten"--phamplet B 1112 (Carl Schenck AG, Darmstadt), pp. 1–6.
"The Automotive Industry and Schenck, Balancing" phamphlet B-1112 (Carl Schenck AG, Darmstadt), pp. 1–6.

Primary Examiner—John Chapman
Attorney, Agent, or Firm—Connolly and Hutz

[57] ABSTRACT

A machine for mass-centering rotors consists of a pair of spaced apart headstocks, each rotatably supporting an adapter disc, and each equipped with a device for the application of machining centers in a rotor being investigated. Adjuster mechanisms on the adapter discs are removably secured to the ends of the rotor, whereby rotation of the discs causes the rotor to rotate. The headstocks are connected to a vibration sensing vibratory bridge arrangement which picks-up the vibration of the rotor as it rotates. The adjuster mechanisms shift the axis of rotation of the rotor until the unbalance thereof is zero or at a predeterminable level. Rotors of differing length are easily positioned between the headstocks which move toward and away from one another.

7 Claims, 2 Drawing Sheets

MACHINE FOR MASS-CENTERING ROTORS

BACKGROUND OF THE INVENTION

The present invention relates to a machine for the mass-centering of rotors.

Machines which serve the purpose of mass-centering function so that during the mass-centering process the shaft axis of the rotor is made to coincide with the principal axis of inertia or mass axis. Alternatively, the rotor axis is shifted into an axis favorable for balancing. This method is especially used for crankshafts because the methods for unbalance correction are limited. Generally, only counter weights can be used for correction. Also, the counter weights representing predetermined compensations for the mass forces that act on the crankshaft should remain unaltered, if possible.

In a previously known design of a mass-centering machine, such as described in German Patent 975086, the raw crankshaft is received by a balancing cage which is spring supported with respect to the bed of the machine and has rotational and vibrational freedom. Drilling spindles for applying machining centers are located inside each of the two journals of the cage. The cage has two adapter plates interconnected by longitudinal beams. The cage is balanced but becomes unbalanced when the raw crankshaft forging is inserted. Such unbalance is eliminated by shifting the shaft inside the rotating cage. This machine is unable to accept raw crankshafts of different length, and at best, minor differences in crankshaft length can only be accommodated through the adapter and ajustment devices on the adapter discs.

From the printed publication "Die Automobil Industrie und Schenck" (Pamphlet B 1112 - 20 478 A, Carl Schenck AG, Darmstadt) a machine of the above type for mass-centering of rotors in the form of raw crankshafts has two headstocks supported by the bed of the machine through springs bolted to the headstock and machine bed. The headstocks have approximately square dimensions as viewed in the longitudinal direction of the machine and are connected to each other by means of four beams and clamping devices provided on the corners of the square. Within the space defined by the beams adapter discs are provided which are synchronously turnable and rotatably supported with respect to the headstocks. Clamping pieces and counter supports are provided on the side of the adapter discs pointing away from the headstock. The clamping pieces and counter supports between which the end journals of the crankshaft may be placed may be actuated by adjustment drives. By means of two adjustment drives per adapter disc, it is possible to shift each crankshaft end out of the axis of rotation of the adapter discs in two different directions. For example, the crankshaft axis may then be made to coincide with the principal axis of inertia. The device for applying the machining centers is separately placed on the bed of the machine.

The machine of the above publication is not well suited for speedy adjustment of rotors of different length. Such rapid adjustment is needed within the framework of flexible manufacturing, because for each adjustment a multiplicity of connections must be loosened between the machine components. The headstocks and the device that apply the machining centers must also be separately locked in addition to being shifted.

SUMMARY OF THE INVENTION

Accordingly, an object of the present invention is a machine of the type described above which is quickly adaptable by simple means to different length of rotors.

According to the invention, the headstocks are supported by and fastened to at least one guide rail and connected to a vibratory bridge. At least one headstock is longitudinally movable and connected to a vibratory bridge. The springs which provide suport are arranged between the guide rail or guide rails and the machine bed. Also, the headstock and a device for applying the machining centers comprise one common movable unit.

With this embodiment, it is possible to achieve quick and simple adjustment of the machine for different rotor lengths. Such adjustment may also be automated since all that the adjustment requires is loosening of the locking device of a headstock, moving the headstock, and subsequently locking it by means of a clamping device, for .example. Loosening and relocking of further connections is obviated; such connections could be hooking on of springs on the machine bed and connecting of longitudinal beams to the headstocks as well as the making of connections to the machine bed for the device for applying the machining centers. Distortion of machine components resulting from loosening of connections and reconnecting same after moving without sufficient adjustment will not occur with the inventive embodiment. As a result, any danger of impaired function of the machine, especially the function of the measurement apparatus as a result of distortion, is advantageously prevented. Moreover, the space between the headstocks is free for insertion of rotors and unemcumbered by connecting beams between the headstocks.

A further development, especially advantageous with respect to insertion of the rotors, involves arranging the guide rail or guide rails to one side of a plane through the axis of rotation of the adapter discs, preferably below the horizontal plane through the axis of rotation. With this arrangement, no machine components hinder the insertion of rotors on one side of the plane. Also, the plane may be tilted to the horizontal plane, i.e., 45°, because of ergonomic reasons.

An embodiment of the invention includes two guide rails connected by means of cross members to form a frame with a support surface, preferably in a mutual horizontal plane, for sled-like designed headstocks. This arrangement is simple in construction and provides good stability. It is advantageous that a preferably mechanical moving or shifting device for the combined movable component group consisting of the headstock and the device for applying machining centers is supported by the frame.

A simple and sturdy drive for the adapter discs is obtained with a modification whereby both adapter discs are driven by a common motor. The motor as a drive unit is connected with the adapter discs by means of a shaft with bearings in the cross member of the frame. Especially advantageous is a further development whereby the shaft is connected with the motor on the one hand and with the adapter discs on the other by means of belt drives. Very little, if any, extraneous vibrations are caused with such an arrangement.

In a further modification of the present invention, the adapter disc has a hollow-cylindrical section rotatably supported upon a journal-like extension on the headstocks.

Advantages are offered with respect to a simple adjustment of the headstock in an embodiment where the belt drive between the shaft and adapter disc comprises a sheave as part of the adapter disc and a belt pulley axially fixed and rotatably supported by the headstock. The pulley has a bore hole which complements a provided section of the shaft. Longitudinal shifting of the headstock axially shifts the pulley along the shaft. As a result, the pulley rotates with the shaft but is longitudinally movable relative to the shaft.

The headstock and its journal-like extension possess a bore hole which houses part of the device for applying the machining centers. In another modification, an axially movable but not rotatable sleeve is arranged inside the bore hole. A motor driven centering drill inside the sleeve runs in bearings and is axially supported.

BRIEF DESCRIPTION OF THE DRAWING

Novel features and advantages of the present invention in addition to those mentioned above will become apparent to those of ordinary skill in the art from a reading of the following description in conjunction with the accompanying drawing wherein similar reference characters refer to similar parts and in which.

DETAILED DESCRIPTION OF THE INVENTION

Figure 1:
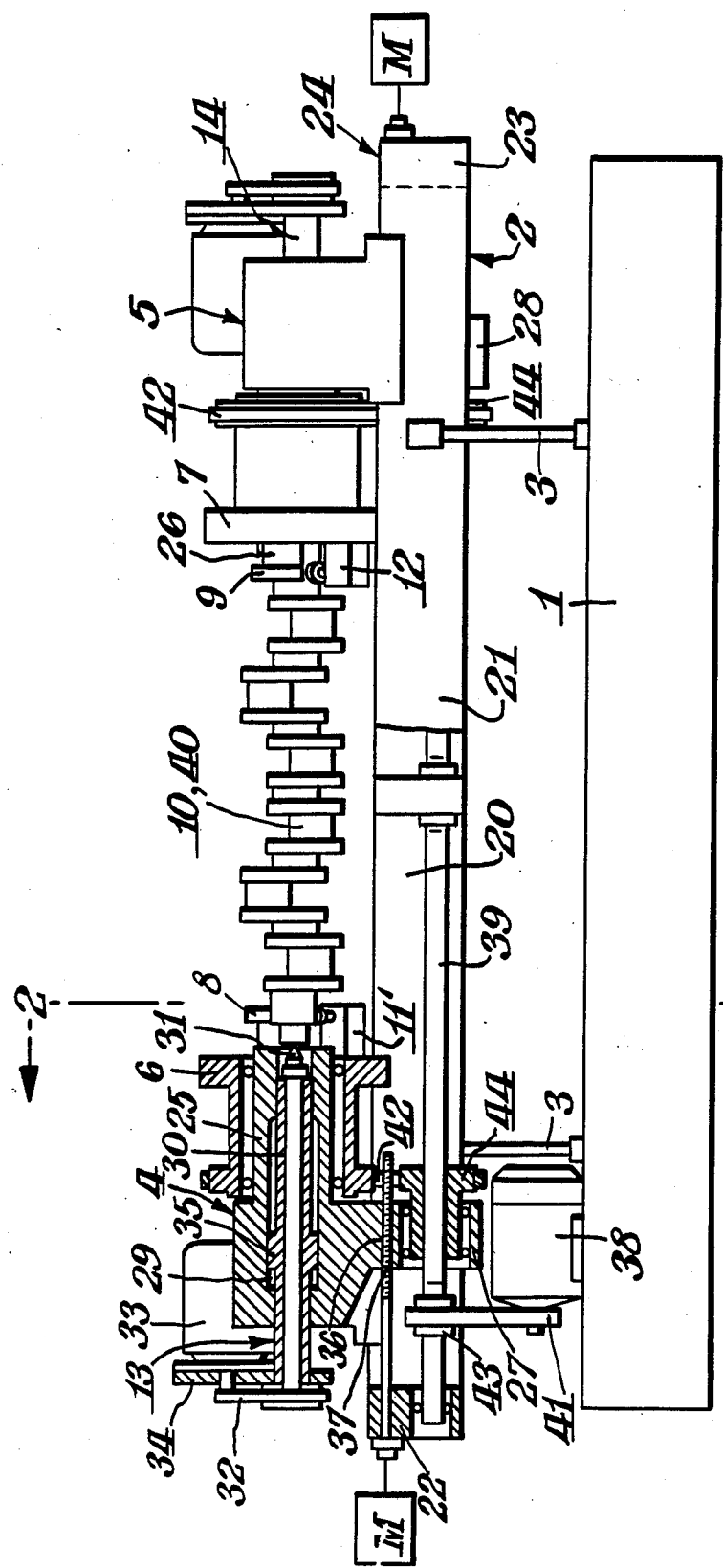
FIG. 1 is a side elevational view of a mass-centering machine according to the present invention with portions thereof in section.

Referring in more particularity to the drawing, FIG. 1 illustrates a mass-centering machine having a machine bed 1. A vibratory bridge 2 includes springs 3 supported by the machine bed. Vibrations in the vibratory bridge caused by unbalance of the rotors are detected by vibration transducers 15 mounted on the bed of the machine, as shown best in FIG. 2. Headstocks 4 and 5 are provided on the vibratory bridge 2 and adapter discs 6 and 7 are rotatably supported on the headstocks. The adapter discs 6 and 7 have adapter devices 8, 9 for acceptance of the end journals of a rotor 40 under test. The rotor illustrated is in the form of a raw crankshaft 10 for mass-centering with the machine.

Adjusters 11 and 12 are coordinated to the adapter devices 8 and 9. By means of the adjusters 8, 9 and 11, 12 coordinated to each headstock 4,5, the shaft axis of the raw crankshaft 10 may be parallel shifted and tilted with respect to the axis of rotation of the machine while the adapter discs 6, 7 are rotating. Such axis is defined by the aligned axes of the headstocks 4, 5 and of the adapter discs 6,7. Once the adjustment of the shaft axis is completed, devices 13, 14 apply machining centers on the end faces of the rough crankshaft. After application of the machining centers, the mass-centered rough crankshaft 10 is taken out of the machine and is transferred for machining and balancing operations.

Vibratory bridge 2 has two guide rails 20,21 which extend in the longitudinal direction of the machine, i.e, in the direction of the unshifted shaft axis of the rotor 10 and the axis of rotation of the adapter discs 6,7. The guide rails are connected by means of cross members 22, 23 to an essentially rectangular frame 24. Two springs 3 are connected to each guide rail 20, 21. The springs are spaced apart in the longitudinal direction and the other end of each spring is fastened to machine bed 1. The guide rails 20, 21 are located in a horizontal plane that lies below the axis of rotation of the machine.

The guide rails 20, 21 shown in the drawing are square tubes having supporting surfaces upon which the sled-like headstocks 4 and 5 are supported in vertical direction. Vertical areas of the headstocks 4 and 5 contact vertical areas of the tubes so that headstocks 4 and 5 are secured against shifting in the cross direction.

Both sled-like headstocks 4 and 5 are movable in a longitudinal direction with respect to the guide rails 20, 21 of the vibratory bridge 2 and the frame 24. The headstocks are lockable with respect to frame 24 by clamping devices. Each headstock 4, 5 has a cylindrical extension 25, 26 as well as a vertical continuation 27, 28 which extends in vertical direction between the guide rails 20, 21. The adapter discs 6, 7 are rotatably supported and axially fixed by means of non-friction bearings upon the cylindrical extensions 25, 26. The distance of the center of cylindrical extensions 25, 26 to the support surfaces coordinated to the guide rails 20, 21 is defined by the maximum throw of the crank geometry of the raw crankshaft 10. In the longitudinal direction a centrally located through-going bore hole 29 extends through each headstock 4 and 5. The bore holes 29 accept parts of the components of the devices 13, 14 for applying the machining centers. Each of the devices 13, 14 includes a centering drill 31 rotatably and axially supported by a sleeve 30. Each drill 31 is powered by means of a belt drive 32 and a motor 33 connected to the end of the drill that extends beyond the sleeve 30 and headstock.

Sleeves 30 are movable in the bore holes 29 of the headstocks 4, 5, and the outer end of each sleeve extends outwardly of its respective headstock. A bearing device 34 is connected to the outer end of the sleeve 30, and the shaft of a motor 33 extends through the bearing for powering the centering drill 31. A belt pulley at the end of the drill shaft is connected to the motor 33. Sleeve 30 has an internal passgeway that accepts the center drill device 31. On its outer circumference the sleeve is equipped with a collar 35 on the outside of the sleeve sealed in a section of the bore hole 29 of the head stock. By pressurizing this sealed section of the bore hole 29, sleeve 30 with the centering drill 31 can be moved out of the bore hole 29 toward the raw crankshaft 10 for applying a machining center or it can be retracted into the bore hole 29 away from the crankshaft to its store position. Such movement of the sleeve 30 is easily accomplished by any convenient means such as an electric motor.

The vertical continuations 27, 28 of the headstocks extend into the inner space of the frame 24. Each continuation has an internally threaded bore hole 36 that receives a threaded spindle 37 fixed to one of the cross member 22, 23 of the frame 24. The position of the headstock 4, 5 is determined by the length of the raw crankshaft 10 and is adjusted by means of the threaded spindle 37 by turning the spindle a desired amount. An electric motor may be connected to rotate the spindle. Once the headstock is properly positioned, the spindle may be locked in place by suitable clamping structure, not shown, which presses the headstock 4 and 5 against guide rails 20, 21. Alternatively, both bearing carriers can be simultaneously adjusted by utilizing a single threaded spindle which passes through internally threaded borings in each headstock.

An element of the rotation mechanism for the adapter discs 6, 7 is rotatably supported in the vertical continuation 27, 28 of the headstock 4, 5. The synchronous drive of both adapter discs 6, 7 takes place by means of a motor 38 fastened to machine bed 1 and connected by belt drive 41 and pulley 43 to shaft 39. Another belt drive 42 for each adapter disc connects the adapter disc 6, 7 to a belt pulley 44 on shaft 39. Pulley 44 is longitudinally slidable on shaft 39 but connected to rotate with the shaft. The shaft 39 is rotatably supported by the cross member 22, 23. Also, the motor 38 may be fastened to frame 24, i.e., to the vibratory bridge 2.

Belt pulley 44 has a profiled inner bore coordinated to a correspondingly profiled section of shaft 39. Also, the belt pulley 44 has a running surface for the belt on its outer circumference and a bearing surface also on its outer circumference by means of which the pulley 44 is rotatably supported in non-friction bearings in a bore hole of the vertical continuation 27, 28 of the headstocks 4,5. The belt pulley 44 is axially fixed in the bore hole. The belt surface of belt pulley 44 cooperates with the belt surface on the adapter disc 6, 7.

The adapter devices 8, 9 and adjusters 11, 12 serve the purpose of accepting the crankshaft ends and of adjusting the shaft axis of the raw crankshaft 10.

Figure 2:
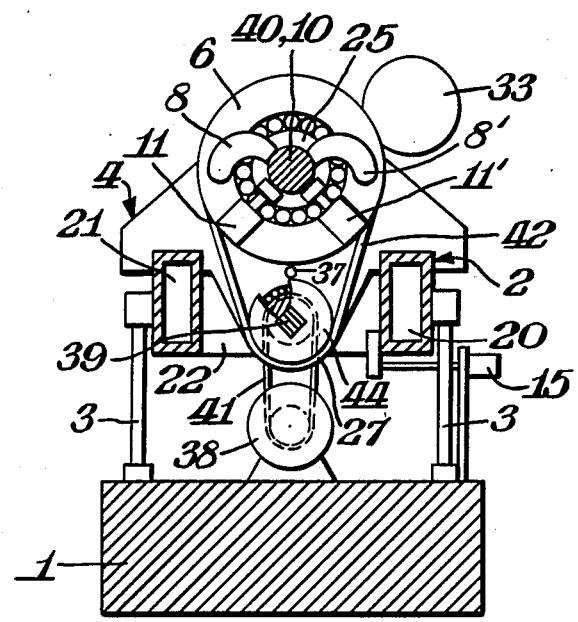
FIG. 2 is a cross-sectional view taken along line 2-2 of FIG. 1.

As shown best in FIG. 2, the ends of raw crankshaft 10 are supported by a pair of the adjusters 11, 11' (12,12') and a pair of pre-tensioned counter supports 8,8' (9,9'), each of which bear against the crankshaft ends. Motors are connected to shift the adjusters 11, 11' (12,12') to thereby change the position of the shaft ends relative to the headstock. Spacial adjustment of the raw crankshaft 10 occurs in accordance with measured unbalances and continues with synchronous rotation of the adapter discs 6, 7 until the unbalance disappears or until a predeterminable unbalance is reached. The shaft then has the desired location of the axis of rotation.

After adjustment of the required spacial position of the shaft axis of the raw crankshaft 10, the two centering drills 31 are synchronously moved into their working positions and apply the machining centers to the faces of the raw crankshaft 10 which define the spacial postion of the shaft axis. The mass-centering procedure is thus finished.

What is claimed is:

1. A machine for mass-centering rotors comprising a machine bed, a pair of spaced apart headstocks, one at each longitudinal end of the machine bed, adapter disc means connected to each headstock constructed and arranged to support the ends of a rotor being investigated and also to cause the rotor to rotate, at least one guide rail interconnecting and supporting the headstocks, vibration sensing structure connected between the machine bed and the guide rail and separated from the head-stocks for determining the unbalance of the rotor as it rotates, adjuster mechanisms for changing the axis of rotation of the rotor as it rotates, means on each headstock for marking the end faces of the rotor at the axis of rotation thereof which results in less than a predetermined rotor unbalance, at least one of the units comprising the headstock and the means for marking being longitudinally shiftable along the guide rail toward the other to thereby accommodate rotors of varying length, common motor means connected to rotate the adapter disc means of each headstock, each adapter disc means being rotatably mounted to its associated headstock, belting interconnecting each adapter disc means to the common rotor means, a journalled shaft arranged generally parallel to the longitudinal axis of the rotor under test and connected for rotation by the motor means, a pair of belt pulleys, one near each longitudinal end of the machine bed, slidably mounted on the journalled shaft but connected to rotate with the shaft, and wherein the belting extends between each adapter disc means and its associated belt pulley to rotate the adapter disc means when the motor means is operational.

2. A machine as in claim 1 including a pair of guide rails interconnecting and supporting the headstocks, one guide rail on each side of the machine.

3. A machine as in claim 2 wherein the guide rails are spaced below the axis of rotation between the headstocks.

4. A machine as in claim 2 including cross members interconnecting the guide rails to thereby define a frame upon which at least one of the headstocks slides toward and away from the other.

5. A machine as in claim 1 wherein a rotatable screw cooperates with the headstock to thereby longitudinally shift the headstock and its associated marking means.

6. A machine as in claim 1 wherein the means for marking each end face of the rotor comprises a rotatable drill movable relative to the headstock toward and away from the ends of the rotor.

7. A machine as in claim 6 wherein each headstock includes a hollow sleeve within which the rotatable drill is positioned, means to rotate the drill, and means to move the drill toward and away from the ends of the rotor.

* * * * *